US006427720B1

(12) United States Patent
Hayashi et al.

(10) Patent No.: US 6,427,720 B1
(45) Date of Patent: Aug. 6, 2002

(54) PILOT OPERATED DIRECTIONAL CONTROL VALVE HAVING POSITION DETECTING FUNCTION

(75) Inventors: Bunya Hayashi; Makoto Ishikawa, both of Ibaraki (JP)

(73) Assignee: SMC Corporation, Tokyo (JP)

( * ) Notice: Subject to any disclaimer, the term of this patent is extended or adjusted under 35 U.S.C. 154(b) by 60 days.

(21) Appl. No.: 09/592,735

(22) Filed: Jun. 13, 2000

(30) Foreign Application Priority Data

Jul. 13, 1999 (JP) .......................................... 11-199280

(51) Int. Cl.[7] ............................................... F16K 37/00

(52) U.S. Cl. ............. 137/554; 137/625.64; 137/625.66; 137/557

(58) Field of Search ............................ 137/554, 625.64, 137/625.66, 557

(56) References Cited

U.S. PATENT DOCUMENTS 5,101,856 A * 4/1992 Kakinuma et al. .......... 137/554
5,623,967 A 4/1997 Hayashi ................. 137/625.64
5,819,783 A * 10/1998 Blatt et al. .................. 137/271
5,826,616 A * 10/1998 Golden ...................... 137/554

FOREIGN PATENT DOCUMENTS

| | | |
|---|---|---|
| JP | 2-66784 | 5/1990 |
| JP | 2-66785 | 5/1990 |
| JP | 2-88079 | 7/1990 |

* cited by examiner

*Primary Examiner*—A. Michael Chambers
(74) *Attorney, Agent, or Firm*—Oblon, Spivak, McClelland, Maier & Neustadt, P.C.

(57) ABSTRACT

The present invention aims to provide a simply constructed pilot operated directional control valve having a position detecting function, capable of detecting, utilizing a light sensor, operating positions of a valve member such as a spool. To achieve this, an object to be detected 21 is formed on the end face adjacent to a breathing chamber 9, of a piston 2*a*; there is formed a recess 22 in which the object to be detected 21 is fit and which is disposed in the wall surface of the breathing chamber 9, in a casing 4; and an optical sensor 25 is mounted on a position facing the recess 22 in the casing 4 for projecting and receiving light relative to the object to be detected 21 through a through hole 23, whereby operating positions of the piston 12*a*, or the spool 6 are detected based on the light reflected from the object to be detected 21.

6 Claims, 5 Drawing Sheets

PILOT OPERATED DIRECTIONAL CONTROL VALVE HAVING POSITION DETECTING FUNCTION

TECHNICAL FIELD

The present invention relates to a pilot operated directional control valve having a position detecting function, improved by permitting the detection of operating positions of a valve member such as a spool, through the use of light.

BACKGROUND ART

The directional control valve capable of detecting the changeover position of a spool utilizing a magnet is well known as disclosed in, for example, Japanese Unexamined Utility Model Publication No. 2-66784 (Japanese Utility Model Application No. 63-144027 on microfilm). This directional control valve detects the changeover position of the spool by mounting a magnet on the spool, mounting a magnetic sensor on a casing, and detecting the magnet moving together with the spool by means of the magnetic sensor.

However, the conventional directional control valve described in the above-mentioned known document adopts the method wherein a magnet is used as an object to be detected, and wherein the magnetism from this magnet is detected by a magnetic sensor, and therefore, the conventional directional control valve is susceptible to an external magnetic field. For example, under the circumstances where a welder in which a large current flows or where a large-sized motor is used, the magnetic sensor can cause a malfunction due to an external magnetic field generated by electrical current. This makes it difficult to maintain a given detecting accuracy, and has created a problem in reliability.

On the other hand, the above-mentioned known document includes a proposition of detecting the changeover position of a spool using an optical sensor. In accordance with this method, positions of the spool can be detected without being affected by external magnetic field, but this document does not show any specific construction for substantiating this proposition.

DISCLOSURE OF INVENTION

The main technical problem of the present invention is to provide a simply constructed pilot operated directional control valve having a position detecting function, improved by permitting the detection of operating positions of a valve member such as a spool, using an optical sensor.

The subordinate technical problem of the present invention is to increase the ease of maintenance by disposing the optical sensor at a predetermined position on a casing, in the above-mentioned directional control valve.

In order to solve the above-described problems, in accordance with the present invention, there is provided a pilot operated directional control valve having a position detecting function, comprising a plurality of ports; a valve hole to which each of these ports is opened; a casing having the ports and the valve hole; a valve member slidably received in the valve hole for changing over flow passages; a piston chamber formed on at least one end side of the valve member; a piston which is slidably received in the piston chamber, and which operates by the action of pilot fluid pressure to change over the valve member; a pilot valve for supplying the piston with a pilot fluid; a through hole formed at a portion of the casing so that the object to be detected on the piston can be seen through therethrough; an optical sensor disposed so as to be able to project and receive light through the through hole for detecting operating positions of the piston by the light reflected from the piston.

In the directional control valve having the above-described described features, when the piston is supplied with a pilot fluid by the pilot valve, the piston operates by the action of the pilot fluid pressure and changes over the valve member. At this time, through the through hole of the casing, the projection of light to the piston and the reception of the reflected light is performed by the optical sensor, and thereby operating positions of the piston, or that of the valve member is detected in response to the change in quantity of received light.

Thus, in accordance with the present invention, it is possible to execute the detection of positions of a valve member using a optical sensor without being affected by external magnetic field. In addition, since the present directional control valve is constituted so as not to directly detect the movement of the valve member but to indirectly detect positions of the valve member by detecting the piston, the structure of a detecting mechanism becomes simpler. If the present directional control valve were constituted to directly detect a valve member, the through hole would have to be formed at a place from which the valve member inside a valve hole can be seen through therethrough so that light can be projected and received relative to the valve member. However, since such a place corresponds to a portion directly facing a passage of a hydraulic fluid, it is necessary to form the through hole and install the optical sensor so as not to cause leakage of fluid. This makes the structure complicated and makes the machining difficult. In contrast, since the present invention is constituted so as to form a through hole at a portion of the casing from which a portion of the piston can be seen through the through hole, and to project and receive light relative to the piston through the through hole, it is possible to install the detecting mechanism at a place independent of the passage of a hydraulic fluid. This eliminates the necessity for structural considerations of preventing the hydraulic fluid from leakage.

In accordance with a specific embodiment of the present invention, the above-described directional control valve is constituted so as to comprise breathing chambers which are opened to the outside and which are each disposed between the valve member and the piston; an object to be detected which protrudes parallel with the axis of the valve member and which is situated on the end face of the piston, adjacent to a breathing chamber; a recess in which the object to be detected is fit and which is disposed in the wall surface of the breathing chamber, in the casing, and the through hole formed at a position facing the recess, whereby the object to be detected is detectable in the recess.

Thereby, even if the body of the piston can not be directly detected because the installation site for an optical sensor can not be secured around the piston chamber, the piston can reliably be detected via the object to be detected. In addition, even if the optical sensor is made to directly face the object to be detected by making the through hole opened to the recess, there is no need to worry about a hydraulic fluid or a pilot fluid leaking through this through hole, since the recess is formed within the breathing chamber.

In accordance with a preferred embodiment of the present invention, the object to be detected is formed into annular shape having the same diameter as that of the piston, and the recess is formed into annular shape having the same diameter as that of the piston chamber.

In accordance with another specific embodiment of the present invention, there is provided a directional control valve having a constitution wherein the through hole is formed at a position opposite to an end face of the piston, on the central axis of the piston, wherein the optical sensor is disposed so as to be able to project and receive light relative to the end face of the piston, and wherein operating positions of the piston is detected based on the change in quantity of the received light caused by the change in the distance due to the displacement of the piston.

This features can be suitably applied, in a double-pilot operated directional control valve having two pistons and the two pilot valves, to the case where the two pilot valves are concentratedly provided on one side of the casing. By installing the optical sensor onto the other side where no pilot valve of the casing is provided, the installation of the optical sensor becomes simpler and also the maintenance thereof becomes much easier.

DETAILED DESCRIPTION OF THE INVENTION

Figure 1:
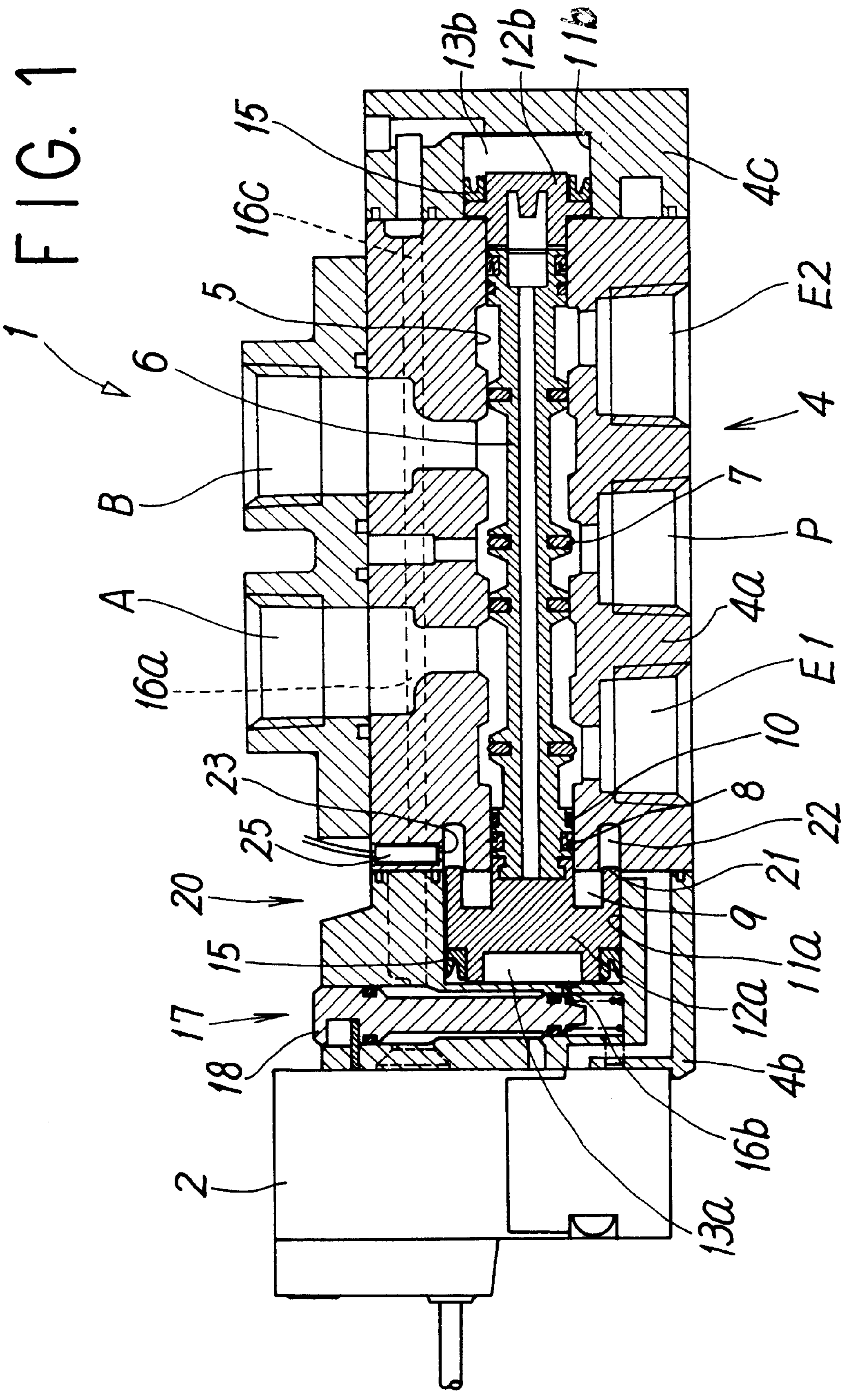
FIG. 1 is a longitudinal sectional view of a first embodiment of the directional control valve in accordance with the present invention.

FIG. 1 shows the first embodiment of the directional control valve in accordance with the present invention. The directional control valve here exemplified is a single-pilot operated directional control valve wherein a main valve 1 is changed over by one pilot valve 2.

The main valve 1 has a construction as a 5-port valve, and includes a casing 4. The casing 4 comprises a first member 4*a* of cuboid shape, a second member 4*b* which is connected to one end of the first member 4*a* and which also serves as an adapter for mounting the pilot valve 2, and a third member 4*c* which is connected to the other end of the first member 4*a* and which functions as an end cover.

A supply port P and two discharge ports E1 and E2 are provided on either of the upper and lower surfaces of the first member 4*a*, and two output ports A and B are provided on the other surface. Inside the first member 4*a*, there is provided a valve hole 5 to which these ports are each opened being arranged in the axial direction. In the valve hole 5, there is slidably received a spool 6 which is a valve member for changing over flow passages.

On the outer periphery of the spool 6, there are provided a plurality of sealing members 7 for mutually defining flow passages connecting the ports, and on the outer periphery of each of both end portions of the spool 6, there are provided respective end sealing members 8 for shutting off the breathing chambers 9 facing the end of the spool 6, from the passages of the hydraulic fluid in the valve hole 5. Reference numeral 10 in FIG. 1 denotes a guide ring for stabilizing the sliding of the spool 6.

On the other hand, in the second member 4*b* and the third member 4*c*, the piston chambers 11*a* and 11*b* are formed respectively, at positions facing both ends of the spool 6. A first piston chamber 11*a* formed in the second member 4*b* has a large diameter, and a first piston 12*a* of large diameter is slidably received in the first piston chamber 11*a*, while a second piston chamber 11*b* formed in the third member 4*c* has a smaller diameter than the first piston chamber 11*a*, and a second piston 12*b* of small diameter is slidably received in the second piston chamber 11*b*. These pistons 12*a* and 12*b* are unitarily coupled to the spool 6 as represented by the first piston 12*a*, or abutted against the end faces of the spool 6 as represented by the second piston 12*b*, respectively, and thereby the pistons 12*a* and 12*b* move in synchronization with the spool 6.

First and second pressure chambers 13*a* and 13*b* are formed on the back sides of the pistons 12*a* and 12*b*, that is, on the opposite sides of the piston surfaces abutting against the spool 6, respectively. Between the pistons 12*a* and 12*b*, and the spool 6, there are formed the breathing chambers 9 and 9 which are opened to the outside, respectively. The pressure chambers 13*a* and 13*b* are hermetically shut off from the breathing chambers 9 and 9 by piston packing 15 and 15 mounted on the outer peripheries of the pistons 12*a* and 12*b*, respectively.

The first pressure chamber 13*a* situated adjacently to the first piston 12*a* of large diameter communicates with the supply port P through the pilot fluid passages 16*a* and 16*b* via a manual operating mechanism 17 and the above-mentioned pilot valve 2, while the second pressure chamber 13*b* situated adjacently to the second piston 12*b* of small diameter always communicates with the supply port P through the pilot fluid passage 16*c*.

When the pilot valve 2 is in the "off" state, that is, when the first pressure chamber 13*a* is not supplied with the pilot fluid, the second piston 12*b* is pushed by the pilot fluid pressure supplied to the second pressure chamber 13*b*, so that the spool 6 is situated at the first changeover position shifted to the left side, as shown in FIG. 1. Once the pilot valve 2 is turned "on", that is, the first pressure chamber 13*a* is supplied with the pilot fluid, the spool 6 is pushed by the first piston 12*a*, so that the spool 6 moves to the right side and occupies the second changeover position. This is because the acting force of the fluid pressure acting on the first piston 12*a* is larger than that acting on the second piston 12*b* due to the difference in pressure receiving area between the two pistons 12*a* and 12*b*.

The above-mentioned manual operating mechanism 17 is adapted to directly connect the pilot fluid passages 16*a* and 16*b* by depressing an operating element 17*a*, and thereby to make the first pressure chamber 13*a* communicate with the supply port P. This operating state is the same as that in the case where the pilot valve 2 is "on".

Here, the above-mentioned pilot valve 2 is an electromagnetically operated solenoid valve for opening/closing pilot fluid passages by energizing the solenoid. Since the constitution and operation of the pilot valve 2 are the same as the known one, specific explanation thereof is omitted.

Figure 2:
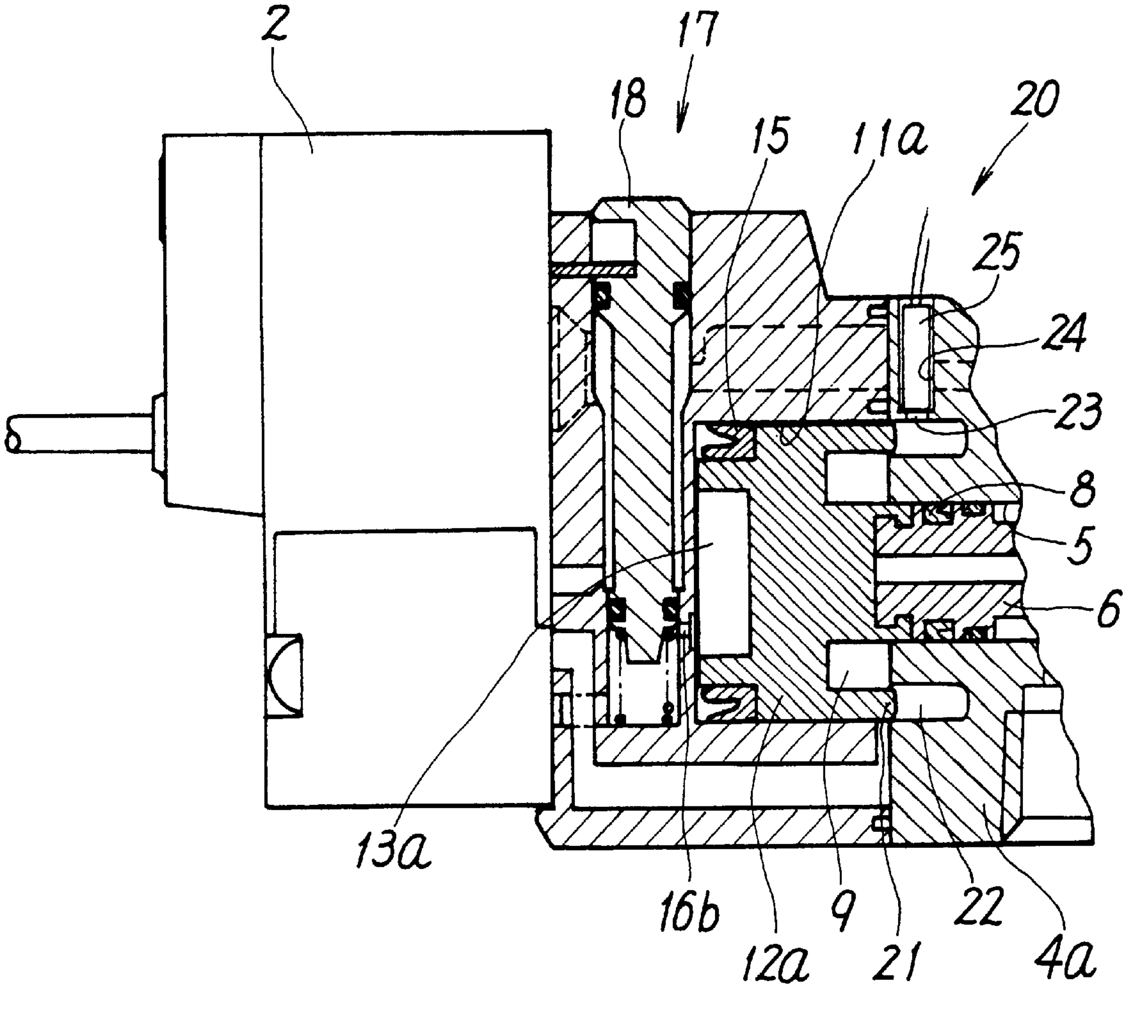
FIG. 2 is an enlarged view showing a main section of FIG. 1.

The above-described directional control valve is provided with a position detecting mechanism 20 for detecting operating positions of the spool 6 via any one of the pistons (exemplified in drawings is the first piston 12*a*). As shown in FIG. 2, the position detecting mechanism 20 comprises the object to be detected 21 formed on the end face adjacent to the breathing chamber 9, of the first piston 12*a*, the recess 22 in which the object to be detected 21 is fit and which is formed in the wall surface of the breathing chamber 9 in the first portion 4*a* of the casing 4, the through hole 23 and the optical sensor housing 24 formed so as to be opened to a portion of the side wall of the recess 22, and the optical sensor 25 disposed in the housing 24. The optical sensor 25 has the function of projecting light into the recess 22 through the through hole 23, and also has the function of receiving the reflected light from the object to be detected 21. Here, the through hole 23 may be fit over with a transparent material such as glass or synthetic resin.

The object to be detected 21 has annular shape with the same diameter as that of the first piston 12*a*, and is formed so as to protrude from an end face of the piston parallel and coaxially with the axis of the spool 6. On the other hand, the recess 22 is formed into annular shape with the same diameter as that of the piston chamber 11*a*. If the piston 12*a* is moved to the first changeover position shown in FIGS. 1 and 2, the object to be detected 21 occupies a undetectable position that is deviated from the through hole 23, and if the piston 12*a* is moved to the second changeover position opposite to the first changeover position, the object to be detected 21 occupies the detectable position which covers the through hole 23. When the object to be detected 21 is located at a undetectable position, since the reflected light from the object to be detected 21 is not received by the optical sensor 25, the optical sensor 25 is in the "off" state, and no detection signal is outputted. On the other hand, when the object to be detected 21 is located at the detectable position, since the reflected light from the object to be detected 21 is received by the optical sensor 25, the optical sensor 25 turns "on", and a detection signal is outputted. Thus, by detecting the presence/absence of the object to be detected 21 using the optical sensor 25, it is possible to detect operating positions of the spool 6 via the piston 12*a*. Here, the object to be detected 21 may additionally have a light reflecting plate.

Figure 3:
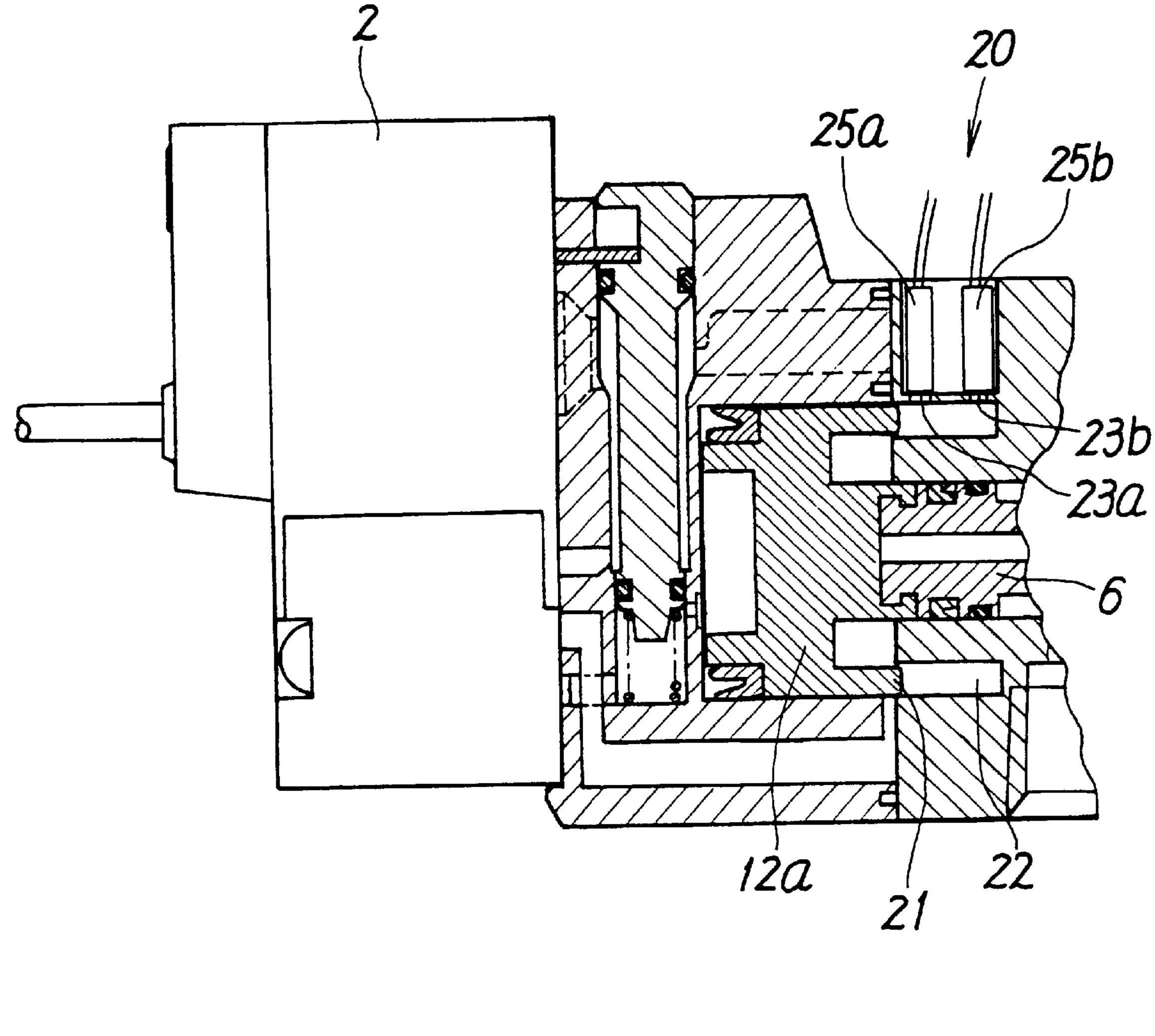
FIG. 3 is a longitudinal sectional view showing the main section of a second embodiment of the directional control valve in accordance with the present invention.

In this case, as in the second embodiment shown in FIG. 3, the present invention may be constituted as follows. Through holes 23*a* and 23*b*, and optical sensors 25*a* and 25*b* are installed at the two spots on the inlet side and the bottom side of the recess 22. In the case where the object to be detected 21 is moved from the first changeover position to the second changeover position as shown in drawings, the first optical sensor 25*a* situated on the inlet side detects the startup of the piston 12*a* by turning on upon detecting the reflected light, and the second optical sensor 25*b* situated on the bottom side detects the arrival at the stroke end, of the piston 12*a* when turning on upon detecting the reflected light. Conversely, in the case where the object to be detected 21 is returned from the second changeover position to the first changeover position, the second optical sensor 25*b* situated on the bottom side detects the startup of the piston 12*a* by turning off, and the first optical sensor 25*a* situated on the inlet side detects the arrival at the return stroke end, of the piston 12*a* when turning off.

Thus, in accordance with the above-described directional control valve, use of the optical sensors 25, 25*a*, and 25*b* permits the detection of positions of the spool 6 without being effected by external magnetic field. In addition, the present embodiment is constituted so as not to directly detect the movement of the spool by the optical sensor 25, 25*a*, and 25*b*, but to indirectly detect positions of the spool by detecting the piston, so that a position detecting mechanism 20 can be built into a place independent of flow passages of the hydraulic fluid. This simplifies the installation structure of the position detecting mechanism.

Furthermore, since the present embodiment is constituted so as to detect the movement of the piston 12*a* via the object to be detected 21 formed on the piston 12*a*, it is possible to reliably detect the piston 12*a* via the object to be detected 21, even if the body portion of the piston 12*a* can not be directly detected because an installation site for the optical sensors 25, 25*a*, and 25*b* can not be secured around the piston chamber 11*a*. In addition, even if the optical sensor 25, 25*a*, and 25*b* are made to directly face the object to be detected 21 by making the through hole 23, 23*a*, and 23*b* opened to the recess 22, there is no need to worry about the hydraulic fluid or the pilot fluid leaking through the through hole 23, since the recess 22 is formed within the breathing chamber 9.

Moreover, the present invention may be constituted so that the optical sensors 25, 25*a* and 25*b* are connected to a discriminating circuit (not shown), and the discriminating circuit discriminates whether the changeover operation of the piston 12*a* (and consequently spool 6) is normal or not, based on detection signals from the optical sensors 25, 25*a* and 25*b*. In this case, in the discriminating circuit, the relations between the operating time and the operating position when the spool 6 normally operates, and the range of the operating time to be judged as an abnormal operation, etc. have been inputted in advance. The discriminating circuit is constituted so as to discriminate whether the changeover operation of the spool 6 is normal or not, by comparing the signals from the optical sensors 25, 25*a*, and 25*b* with the above-mentioned input data. Thereby, it is possible to predict a sign of failure beforehand and to take precautionary measures against it, thereby avoiding an situation such that the operation of device stops for a long time due to the occurrence of a failure or an accident.

In the above-described first embodiment, as a single-pilot type directional control valve, there was shown a directional control valve having two pistons 12*a* and 12*b*, large and small. However, it goes without saying that the directional control valve may be of the spring-return type which has a return spring in place of the second piston 12*b* of small diameter, and which always energizes the spool 6 in the return direction by the energizing force of the return spring.

Also, the above-described directional control valve may be a double-pilot type valve having two pistons and two pilot valves.

Figure 4:
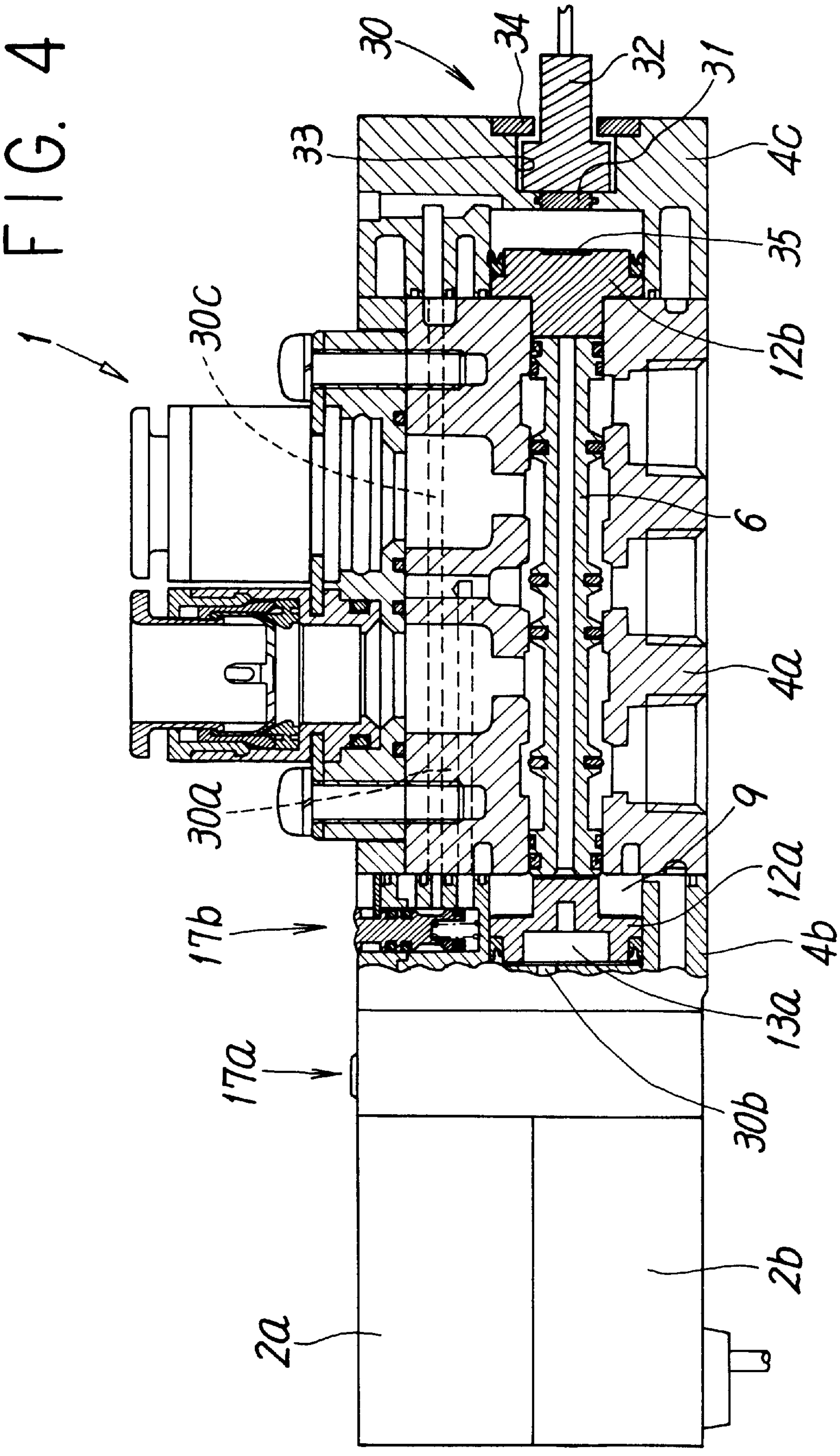
FIG. 4 is a longitudinal sectional view showing a main section of a third embodiment of the directional control valve in accordance with the present invention.
Figure 5:
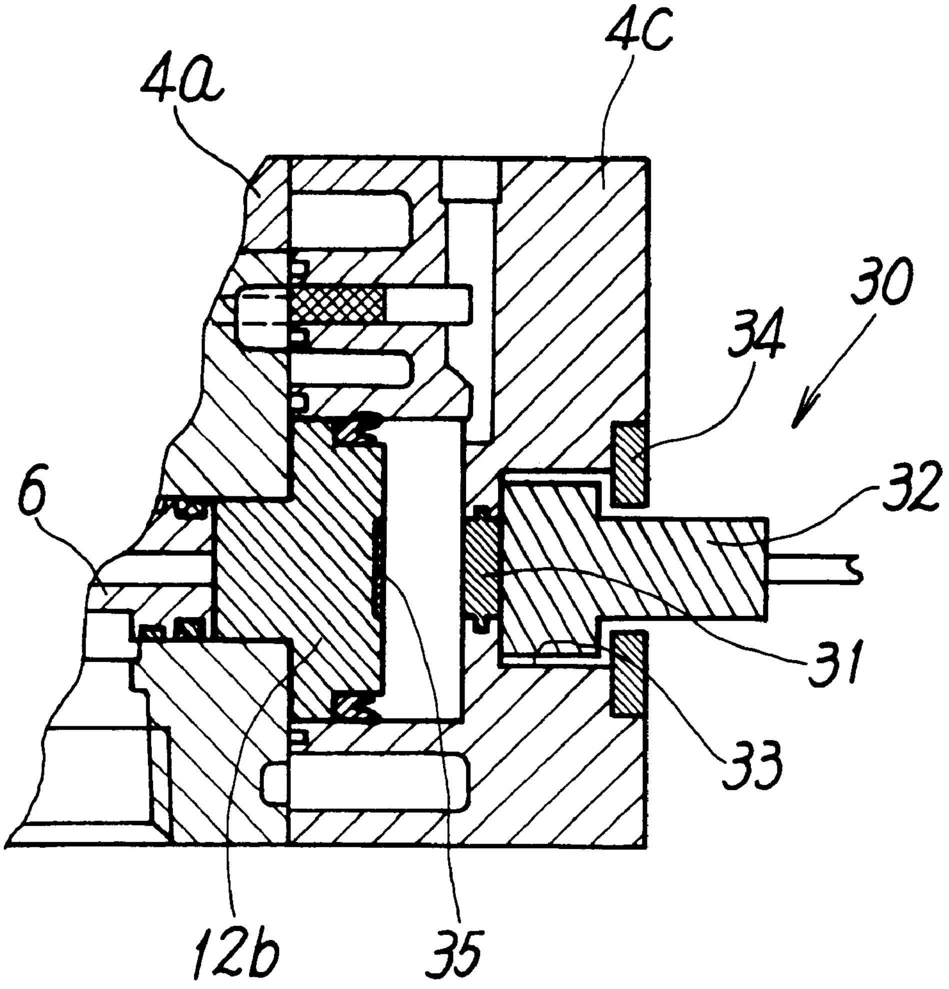
FIG. 5 is an enlarged view showing the main section of FIG. 4.

FIG. 4 shows a third embodiment of the present invention. The directional control valve of the third embodiment has two pilot valves 2*a* and 2*b*, and two manual operating mechanisms 17*a* and 17*b*. The pilot valves 2*a* and 2*b* are concentratedly mounted on the one end side (adjacent to the first piston 12*a*) of the casing 4, and a position detecting mechanism 30 is provided on the side adjacent to the second piston 12*b* opposite to the side on which the two valves 2*a* and 2*b* are provided.

Although the above-mentioned two valves 12*a* and 12*b* have the same size, and are each abutted against an end face of the spool 6 without being unitarily coupled to the spool 6, they may be unitarily coupled to the spool 6. The first pressure chamber 13*a* communicates with the supply port P through the pilot fluid passages 30*a* and 30*b* via the first pilot valve 2*a* and the first manual operating mechanism 17*a*, and the second pressure chamber 13*b* communicates with the supply port P through the pilot fluid passage 30*a* and 30*c* via the second pilot valve 2*b* and the second manual operating mechanism 17*b*.

The above-described directional control valve is constituted so as to drive the two pistons 12*a* and 12*b* to change over the spool 6 by alternately supplying the first pressure chamber 13*a* and the second pressure chamber 13*b* with the pilot fluid by means of the two pilot valves 2*a* and 2*b*.

The position detecting mechanism 30 has a through hole 31 formed on the third member 4*c* of the casing 4, and a optical sensor 32 mounted on the third member 4*c* so as to be able to project and receive light, through the through hole 31, relative to the object to be detected 35 on an end face of the second piston 12*b*. The through hole 31 is formed by fitting a transparent member such as glass or synthetic resin over the hole formed at a position opposite to the end face of the piston 12*b*, on the central axis of the piston 12*b*. The optical sensor 32 is removably installed with a retaining ring in the housing 33 formed in the third member 4*c*. Here, the object to be detected may additionally have a light reflecting plate as required.

In this position detecting mechanism 30, when the piston 12*b* is moved between the first changeover position and the second changeover position, the quantity of the reflected light received by the optical sensor 32 changes in response to the change in distance between the piston 12*b* and the optical sensor 32, so that operating positions of the piston 12*b*, or the spool 6 can be detected over the whole stroke, from the change in quantity of the received light.

The constitution of the above-described third embodiment has an advantage as follows. In the double-pilot type directional control valve having two pistons 12*a* and 12*b* and two pilot valves 2*a* and 2*b* as shown in drawings, wherein the two pilot valves 2*a* and 2*b* are concentratedly disposed on one end of the casing 4, by disposing the position detecting mechanism 30 on the other side on which the pilot valves 2*a* and 2*b* of the casing 4 are not installed, not only the installation of the position detecting mechanism 30 becomes simpler, but also the repair or exchange of the optical sensor 32 or the through hole 31 at their failure becomes easier, and in some cases the third member 4*c* may be exchanged as a whole. This permits a speed-up in working.

Of course, however, the construction of the position detecting mechanism in the third embodiment can also be applied to the single-solenoid type directional control valve shown in the first embodiment.

As have been described hereinbefore in detail, in accordance with the present invention, there is provided a simply constructed pilot operated directional control valve having a position detecting function, capable of detecting, through the use of light sensors, operating positions of a valve member such as a spool.

Also, by disposing the position detecting mechanism including the optical sensor on the side opposite to the side on which the pilot valves of the casing are provided, not only the installation of the position detecting mechanism becomes simpler, but also the repair or exchange of the optical sensor at is failure becomes easier, which results in an improvement in ease of maintenance.

What is claimed is:

1. A pilot operated directional control valve having a position detecting function, comprising:

a plurality of ports;

a valve hole to which each of said ports is opened;

a casing having said ports and said valve hole;

a valve member for changing over flow passages, said valve member being slidably received in the valve hole;

a piston chamber formed on at least one end side of said valve member;

a piston slidably received in said piston chamber, said piston operating by the action of pilot fluid pressure to change over said valve member;

a pilot valve for supplying said piston with a pilot fluid;

a through hole formed on said casing so that an object to be detected on said piston can be seen therethrough;

an optical sensor disposed so as to be able to project and receive light relative to said piston through said through hole, said optical sensor detecting operating positions of said piston by the light reflected from said piston;

breathing chambers each opened to the outside, said breathing chambers being each disposed between said valve member and said piston, wherein said object to be detected which protrudes parallel with the axis of said piston is disposed on the end face of said piston, adjacent to said breathing chamber; and a recess in which said object to be detected is fit, said recess being disposed in the wall surface of said breathing chamber, in said casing, wherein said through hole is formed at a position facing said recess, whereby operating positions of said object to be detected can be detected in said recess.

2. A directional control valve as claimed in claim 1, wherein said object to be detected is an annular ring having the same diameter as that of the piston, and wherein said recess is an annular ring having the same diameter as that of the piston chamber.

3. A directional control valve as claimed in claim 1, wherein said piston having said object to be detected is unitarily coupled to the valve member.

4. A directional control valve as claimed in claim 1, wherein a reflecting plate for reflecting light is installed on said object to be detected on said piston.

5. A pilot operated directional control valve having a position detecting function, comprising:

a plurality of ports;

a valve hole to which each of said ports is opened;

a casing having said ports and said valve hole;

a valve member for changing over flow passages, said valve member being slidably received in the valve hole;

a piston chamber formed on at least one end side of said valve member;

a piston slidably received in said piston chamber, said piston operating by the action of pilot fluid pressure to change over said valve member;

a pilot valve for supplying said piston with a pilot fluid;

a through hole formed on said casing so that an object to be detected on said piston can be seen therethrough; and an optical sensor disposed so as to be able to project and receive light relative to said piston through said through hole, said optical sensor detecting operating positions of said piston by the light reflected from said piston, wherein said through hole is formed so as to be opposed to said object to be detected disposed on the end face of said piston along the central axis of the piston of said casing, and wherein said optical sensor is disposed so as to be able to project and receive light relative to said object to be detected, said optical sensor being constituted so as to detect operating positions of said piston based on the change in quantity of the received light caused by the change in distance due to the displacement of said piston.

6. A directional control valve as claimed in claim 5, wherein said directional control valve is a double-pilot type directional control valve having two pistons and two pilot valves, wherein said two pilot valves are concentratedly provided on one end side of the first piston, in the casing, and wherein said optical sensor is provided on the other side in said casing so as to be able to detect operating positions of a second piston.

* * * * *